(12) United States Patent
Nestle et al.

(10) Patent No.: US 11,843,133 B2
(45) Date of Patent: Dec. 12, 2023

(54) ELECTROCHEMICAL CELL WITH CONTACT LUG

(71) Applicant: VARTA Microbattery GmbH, Ellwangen Jagst (DE)

(72) Inventors: Marc Oliver Nestle, Singapore (SG); Sunil Siddannavar, Karanataka (IN)

(73) Assignee: VARTA Microbattery GmbH, Ellwangen Jagst (DE)

( * ) Notice: Subject to any disclaimer, the term of this patent is extended or adjusted under 35 U.S.C. 154(b) by 147 days.

(21) Appl. No.: 17/474,433

(22) Filed: Sep. 14, 2021

(65) Prior Publication Data

US 2022/0085466 A1 Mar. 17, 2022

(30) Foreign Application Priority Data

Sep. 16, 2020 (EP) ..................................... 20196530

(51) Int. Cl.
*H01M 50/559* (2021.01)
*H01M 50/181* (2021.01)
(Continued)

(52) U.S. Cl.
CPC ..... *H01M 50/559* (2021.01); *H01M 10/0427* (2013.01); *H01M 10/0525* (2013.01);
(Continued)

(58) Field of Classification Search
CPC ............. H01M 50/559; H01M 50/181; H01M 50/109; H01M 50/528; H01M 50/3425;
(Continued)

(56) References Cited

U.S. PATENT DOCUMENTS

| 4,256,812 A * | 3/1981 | Tamura ............. H01M 50/3425 |
| | | 429/56 |
| 2005/0019654 A1* | 1/2005 | Kishida .................. H05K 3/308 |
| | | 429/178 |

(Continued)

FOREIGN PATENT DOCUMENTS

| CN | 212571272 U | * | 2/2021 |
| DE | 10 2013 001 371 | | 7/2014 |

(Continued)

OTHER PUBLICATIONS

EPO English Machine Translation of JP 2005340046 originally published to Bando Naoki on Dec. 8, 2005 (Year: 2005).*

(Continued)

*Primary Examiner* — Cynthia H Kelly
*Assistant Examiner* — Niara Trant
(74) *Attorney, Agent, or Firm* — DLA Piper LLP (US)

(57) ABSTRACT

An electrochemical cell includes a cylindrical housing that encloses an interior space having a first end face and a second end face that are interconnected by an annular shell, and a positive and a negative electrode are arranged in the interior of the housing, wherein the negative electrode is electrically connected, either directly or via a separate conductor, to the first end face to constitute a negative pole, and the positive electrode is electrically connected, either directly or via a separate conductor, to the second end face to constitute a positive pole, and a contact lug is fastened to the first or second end face of the housing.

15 Claims, 3 Drawing Sheets

(51) Int. Cl.
- *H01M 50/109* (2021.01)
- *H01M 50/528* (2021.01)
- *H01M 50/342* (2021.01)
- *H01M 50/562* (2021.01)
- *H01M 10/04* (2006.01)
- *H01M 10/0525* (2010.01)

(52) U.S. Cl.
CPC ....... *H01M 50/109* (2021.01); *H01M 50/181* (2021.01); *H01M 50/3425* (2021.01); *H01M 50/528* (2021.01); *H01M 50/562* (2021.01)

(58) Field of Classification Search
CPC ........... H01M 50/562; H01M 10/0427; H01M 10/0525; H01M 10/124
See application file for complete search history.

(56) References Cited

U.S. PATENT DOCUMENTS

| | | |
|---|---|---|
| 2008/0089011 A1 | 4/2008 | Tasei et al. |
| 2011/0001618 A1 | 1/2011 | Yabushita et al. |
| 2015/0364728 A1 | 12/2015 | Markert |
| 2015/0372339 A1 | 12/2015 | Pytlik et al. |
| 2020/0196450 A1 | 6/2020 | Nestle et al. |

FOREIGN PATENT DOCUMENTS

| | | | |
|---|---|---|---|
| EP | 3 667 761 A1 | 6/2020 | |
| GB | 2252198 A * | 7/1992 | .......... H01M 2/1229 |
| JP | 2005340046 A * | 12/2005 | |
| WO | 2010/089152 A1 | 8/2010 | |

OTHER PUBLICATIONS

Google English Machine Translation of CN 212571272 originally published to Jiang Helin on Feb. 19, 2021 (Year: 2021).*

* cited by examiner

ELECTROCHEMICAL CELL WITH CONTACT LUG

TECHNICAL FIELD

This disclosure relates to an electrochemical cell having a cylindrical housing and at least one contact lug.

BACKGROUND

The function of electrochemical cells is the storage of energy. They comprise a positive and a negative electrode separated from one another by a separator. In energy storage cells of this type, an electrochemical and energy-releasing reaction occurs, which is constituted of two electrically interconnected, but mutually spatially separated partial reactions. A partial reaction that occurs at a comparatively low redox potential proceeds at the negative electrode. The other partial reaction proceeds at the positive electrode at a comparatively high redox potential. During discharging, electrons are released at the negative electrode by an oxidation process, resulting in an electron stream that flows via an external load to the positive electrode, where a corresponding quantity of electrons are taken up. A reduction process thus occurs at the positive electrode. At the same time, for the purposes of charge equalization, an ion stream corresponding to the electrode reaction is present within the cell. The ion stream passes through the separator, and is delivered by an ion-conducting electrolyte.

In secondary (rechargeable) electrochemical energy storage cells, the discharging reaction is reversible, and it is thus possible for the conversion of chemical energy into electrical energy, associated with discharging, to be reversed.

Small cells such as button cells have particularly numerous fields of application. Button cells, by definition, are cells having a height that is smaller than their diameter. They generally comprise a cylindrical housing constituted of two metallic housing parts that are electrically insulated from one another, one of which is connected as a positive pole, and the other as a negative pole. The housing generally comprises a first and a second end face that respectively assume a circular or oval perimeter, and are interconnected by an annular shell.

To secure cells such as button cells in electronic devices, for example, on circuit boards, contact lugs are frequently required. Contact lugs first function as mechanical fasteners, but second also as electrical conductors. In general, one contact lug is connected to the positive pole, and a second contact lug is connected to the negative pole. Connection with the housing of the button cell is particularly executed by soldering or welding.

For technical production reasons, contact lugs are generally fitted to the end faces of button cells. By bending one of the contact lugs through 90°, the contact lug can be brought to the side of the opposing end face. If the contact lugs are situated in the same plane, the fastening thereof to a circuit board is particularly simple.

Cells with contact lugs are known, for example, from EP 3 667 761 A1 and US 2011/001618 A1.

In recent years, rechargeable button cells have been developed, based upon lithium-ion technology—see, for example, WO 2010/089152 A1. Button cells of that type require enhanced safety measures, on the grounds that, in the event of damage, their high energy density and easily-combustible constituents can constitute a major hazard to consumers.

A known safety measure for button cells involves formation of a rupture cross in one of their end faces. In the event of an excess pressure build-up within a cell, which exceeds a pressure threshold value, the housing of the button cell thus opens in the region of the rupture cross, in a controlled manner, and the excess pressure can be relieved.

However, a rupture cross of this type can easily be obstructed upon the welding of a contact lug to an end face which incorporates a rupture cross.

In cells with contact lugs, a further problem can occur, wherein contact lugs can be detached from the respective end face to which they are secured, in response to impacts, oscillations or vibrations to which they are exposed.

It could therefore be helpful to provide an electrochemical cell that incorporates improved contact lugs for greater resistance to the above-mentioned mechanical loads and/or are characterized by improved safety, particularly in combination with pressure-relief valves such as the above-mentioned rupture cross.

SUMMARY

We provide an electrochemical cell including a cylindrical housing that encloses an interior space, having a first end face and a second end face that are interconnected by an annular shell, and a positive and a negative electrode are arranged in the interior of the housing, wherein the negative electrode is electrically connected, either directly or via a separate conductor, to the first end face to constitute a negative pole, and the positive electrode is electrically connected, either directly or via a separate conductor, to the second end face to constitute a positive pole, and a contact lug is fastened to the first or second end face of the housing, wherein the contract lug includes a first end-mounted contact-connection section at which the contact lug is fastened to the end face, the contact lug includes a second end-mounted contact-connection section for the contact-connection of the electrochemical cell with an external electrical conductor, the contact lug, between the first contact-connection section and the second contact-connection section, includes a damping section capable of free oscillation, and the first contact-connection section and the damping section extend in a parallel plane to the plane of the end face to which the contact lug is fastened, and the second contact-connection section preferably extends at an angle to the plane.

We provide the cell including a cylindrical housing that encloses an interior space, having a first end face and a second end face that are interconnected by an annular shell, and a positive and a negative electrode are arranged in the interior of the housing, wherein the negative electrode is electrically connected, either directly or via a separate conductor, to the first end face to constitute a negative pole, and the positive electrode is electrically connected, either directly or via a separate conductor, to the second end face to constitute a positive pole, and a contact lug is fastened to the first or second end face of the housing, wherein the contract lug includes a first end-mounted contact-connection section at which the contact lug is fastened to the end face, the contact lug includes a second end-mounted contact-connection section for the contact-connection of the electrochemical cell with an external electrical conductor, the contact lug, between the first contact-connection section and the second contact-connection section, includes a damping section capable of free oscillation, and the first contact-connection section and the damping section extend in a parallel plane to the plane of the end face to which the contact lug is fastened, and the second contact-connection section preferably extends at an angle to the plane; wherein the damping section has a curved profile or a circular profile; and wherein the cell includes a safety valve, the cell includes a safety valve in the form of a rupture cross, and the damping section has a curved profile around the safety valve.

We also provide the cell including a cylindrical housing that encloses an interior space, having a first end face and a second end face that are interconnected by an annular shell, and a positive and a negative electrode are arranged in the interior of the housing, wherein the negative electrode is electrically connected, either directly or via a separate conductor, to the first end face to constitute a negative pole, and the positive electrode is electrically connected, either directly or via a separate conductor, to the second end face to constitute a positive pole, and a contact lug is fastened to the first or second end face of the housing, wherein the contract lug includes a first end-mounted contact-connection section at which the contact lug is fastened to the end face, the contact lug includes a second end-mounted contact-connection section for the contact-connection of the electrochemical cell with an external electrical conductor, the contact lug, between the first contact-connection section and the second contact-connection section, includes a damping section capable of free oscillation, and the first contact-connection section and the damping section extend in a parallel plane to the plane of the end face to which the contact lug is fastened, and the second contact-connection section preferably extends at an angle to the plane; wherein the cell includes the contact lug fastened to the first or second end face of the housing, as a first contact lug, and the cell includes a second contact lug on the end face of the housing arranged opposite the end face to which the first contact lug is fastened; and wherein the second contact lug extends over an angled contact lug region in the plane of the opposing end face.

DETAILED DESCRIPTION

Figure 1:
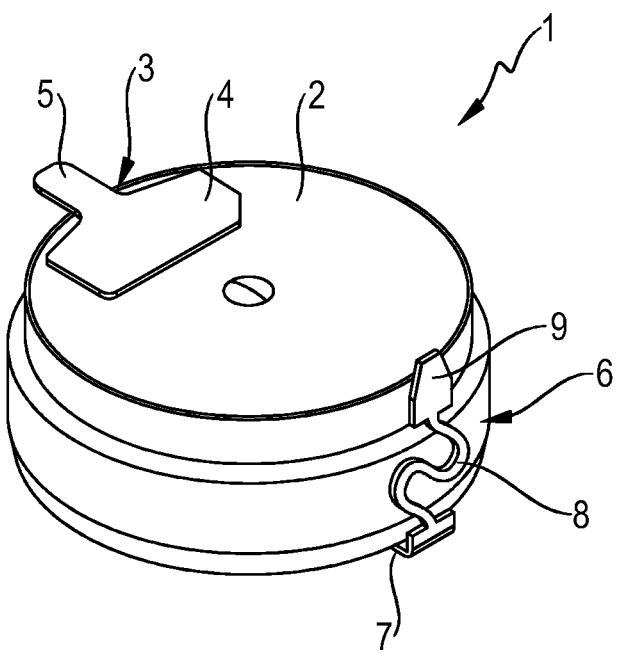
FIG. 1 shows an oblique view of a button cell from the prior art, having a first contact lug and a second contact lug.

Our electrochemical cell is first characterized by the following features:

a. the cell comprises a cylindrical housing that encloses an interior space, having a first end face and a second end face, which are interconnected by an annular shell, b. a positive and a negative electrode are arranged in the interior of the housing, c. the negative electrode is electrically connected, either directly or via a separate conductor, to the first end face to constitute a negative pole, and the positive electrode is electrically connected, either directly or via a separate conductor, to the second end face to constitute a positive pole, and d. a contact lug is fastened to the first or second end face of the housing.

The electrochemical cell, with respect to the contact lug, is further consistently characterized by the following features:

e. the contact lug comprises a first end-mounted contact-connection section, at which the contact lug is fastened to the end face, f. the contact lug comprises a second end-mounted contact-connection section for the contact-connection of the electrochemical cell with an external electrical conductor, g. the contact lug, between the first contact-connection section and the second contact-connection section, comprises a damping section capable of free oscillation, and h. the first contact-connection section and the damping section extend in a parallel plane to the plane of the end face to which the contact lug is fastened, and the second contact-connection section preferably extends at an angle to the plane.

By the configuration of the contact lug with a first end-mounted contact-connection section for fastening the contact lug to the end face, and a second end-mounted contact-connection section for contact-connection with an external electrical conductor, and particularly with the intervening damping section, the cell achieves a substantial improvement with respect to the impact- and vibration-sensitivity of the electrochemical cell. In particular, by the damping section in the central region of the contact lug, impacts, oscillations or vibrations to which the contact lug is exposed can be buffered and attenuated such that the full magnitude of the impacts or oscillations is not applied to the contact-connection sections, and particularly to the first contact-connection section, as a result of which the contact-connection sections, and particularly the first contact-connection section are substantially protected against vibrations.

Fastening a contact lug at the first contact-connection section is executed by welding, wherein, for example, laser welding and, in a particularly advantageous manner, resistance welding can be employed for this purpose. To this end, a plurality of weld points can be provided in the first contact-connection section, for example, two or four or six weld points. In conventional electrochemical cells, a problem can occur wherein, as a result of impacts, oscillations or vibrations acting on the cell, one or more of these weld points are compromised, thus potentially resulting in a loosening, or even a detachment of the contact lug from the end face. In our electrochemical cell, this problem is reduced, wherein impacts, oscillations or vibrations that act on the contact lug are buffered and attenuated by the damping section arranged between the end-mounted contact-connection sections.

Our contact lug thus described can replace a conventional contact lug, which is comprised solely of a planar contact-connection section (first contact-connection section), at which the contact lug is fastened to an end face of the cell, and a contact spike, by which the electrochemical cell can be contact-connected with an external electrical conductor. This contact spike is customarily configured directly on the planar contact-connection section in the form of a narrow projection, and can be angled such that an external electrical conductor can be soldered or clamped, for example, to the contact spike. An example of a contact lug having a non-angled contact spike is shown in FIG. 1 of EP 3 667 761 A1 (reference number 106).

By the buffering of impacts, oscillations or vibrations by the damping section, a connection between the second contact-connection section and an external electrical conductor can also be protected. Thus, for example, manifestations of fatigue or failures and/or cracks in a solder point or a clamping point between the second contact-connection section and the external electrical conductor can be prevented.

Optionally, the damping section of the contact lug can also divert and/or damp electromagnetic waves that might have a damaging effect upon the cell.

As described above, the second contact-connection section, in preferred forms extends at an angle to the plane of the end face to which the contact lug is fastened. In other words, the second contact-connection section is preferably angled in relation to the first contact-connection section and the damping section. An angle of 90° is particularly preferred. In these preferred forms, the boundary between the second contact-connection section and the damping section is preferably constituted by a bending section, at which the contact lug is bent over. In this configuration, the section of the contact lug that is not oriented in parallel with the end face is the second contact-connection section.

In each configuration, the first and second end face of the housing of our cell preferably assume a circular or oval perimeter, and are interconnected by an annular shell.

In the production of the cylindrical cell, the contact lug having the first contact-connection section, the second contact-connection section, and the damping section arranged therebetween, is preferably initially configured as a planar component, for example, a stamped sheet metal part, all the sections of which are arranged in a single plane. In this form, the contact lug can be fastened to the end face of the cell at the first contact-connection section. It is not necessary for the bending or angling of the second contact-connection section to be executed until a later stage to facilitate the connection of the second contact-connection section with an external electrical conductor.

Alternatively, bending or angling can also be executed prior to the fastening of the contact lug to the end face.

The end face to which the above-mentioned contact lug is fastened is preferably that end face of the cylindrical electrochemical cell which constitutes the negative pole of the cell.

Particularly preferably, the cell is characterized by the additional feature specified immediately below:
a. the damping section is not directly connected to the end face, to which the contact lug is fastened.

According to feature a. specified immediately above, the damping section is only indirectly connected to the end face. The damping section thus constitutes, to a degree, a freely-oscillating extension of the first contact-connection section, wherein this freely-oscillating extension forms a transition to the second end-mounted contact-connection section, via which the con-tact-connection of the electrochemical cell to an external electrical conductor can be executed.

Particularly preferably, the damping section of the cylindrical cell is characterized by at least one of features a. to c. specified immediately below:
a. the damping section is configured with a strip shape,
b. the damping section comprises at least one strip-shaped section with an essentially constant width, and
c. the contact lug incorporates a transition from the first contact-connection section to the damping section, in which the width of the contact lug decreases such that the cross-section of the contact lug is reduced by at least 25%, and preferably by at least 50%.

Preferably, both the immediately above-mentioned features a. and b., and particularly preferably features a. to c., are realized in combination with one another.

It is particularly preferred that the strip-shaped section with an essentially constant width, or the damping section, particularly the strip-shaped damping section, assumes a length which exceeds the maximum length of the second contact-connection section, preferably by at least a factor of 2, and particularly preferably by at least a factor of 4.

It is further preferred that the strip-shaped section with an essentially constant width, or the damping section, particularly the strip-shaped damping section, exceeds the maximum length of the first contact-connection section, preferably by at least a factor of 1.1, particularly preferably by at least a factor of 2, and particularly by a factor of 3.

The presence of the transition from the first contact-connection section to the damping section does not preclude the inclusion within the damping section, at least locally, of a further increase in the width, and thus of the cross-section of the contact lug.

The change in width of the contact lug at the transition can be configured incrementally or continuously. By this configuration of the damping section, oscillations, impacts or vibrations originating from the second contact-connection section and acting on the contact lug can be buffered and attenuated in a particularly effective manner, before they reach the first contact-connection section.

Particularly preferably, the damping section is characterized by the following feature:
a. the damping section assumes a curved profile, particularly a circular profile.

The curved profile of the damping section first provides a particular advantage in that a relatively long length of the damping section can thus be achieved, wherein the limited surface area of the end face of the cylindrical cell can be exploited in an optimum manner. By the extension of the damping section thus permitted, impacts, oscillations or vibrations can be buffered even more effectively.

The damping section within the contact lug, to a degree, can thus be track- or strip-shaped, and can preferably be curved. The curved profile can preferably follow an arc of a circle. For example, the damping section can assume the approximate form of a three-quarter circle.

The configuration of the damping section with a curved profile further provides an additional and particular advantage. In particular, by the curved profile, the contact lug can be kept clear of a central region of the end face such that this central region is available for other purposes.

Particularly preferably, the cell is characterized by at least one of features a. to c. specified immediately below:
a. the cell comprises a safety valve,
b. the cell comprises a safety valve in the form of a rupture cross, and
c. the damping section assumes a curved profile around the safety valve.

Preferably, both the immediately above-mentioned features a. and c., and particularly preferably the immediately above-mentioned features a. to c., are realized in combination with one another.

A known safety measure for cells, particularly button cells, is provided wherein a safety valve, particularly in the form of a "rupture cross" is incorporated in one of the end faces. In the event of an excess pressure build-up within the cell, which exceeds a specific pressure threshold value, the safety valve, for example, the rupture cross, which constitutes a predetermined breaking point, can open such that the excess pressure can be relieved.

Particularly preferably, the above-mentioned clear central region of the end face is employed for safety purposes, particularly for the location of the safety valve. The safety valve, and particularly the rupture cross, is particularly advantageously positioned in a region of the end face, particularly in a central region, which is kept clear by the curved profile of the contact lug. It is thus achieved that the rupture cross or, optionally, a safety valve that is configured in a different manner, is not obstructed by the contact lug.

The contact lug of the cylindrical cell is preferably characterized by the additional feature specified immediately below:
a. the contact lug extends beyond the edge of the end face to which it is fastened.

As described above, each of the first and second end faces of the housing of a cell preferably assume a circular or oval perimeter, and are interconnected by an annular shell.

If the second contact-connection section and the damping section are arranged in the same plane, the contact lug preferably projects beyond the edge of the end face to which it is fastened, and preferably also beyond the perimeter of the shell. In this configuration, that part of the contact lug that does not engage with the end face constitutes the second contact-connection section. As the second contact-connection section does not engage with the end face, but is either angled therefrom or projects beyond the edge of the end face to which it is fastened, it is accessible in a particularly practicable manner for contact connection such that a particularly simple connection to an external electrical conductor is possible. For example, in a manner known per se, the second contact-connection section can be connected to an electrical conductor, for example, a wire, by soldering or clamping such that contact with the respective pole of the cell is constituted.

Particularly preferably, the cell is characterized by the additional features a. and b. specified immediately below:
a. the cell comprises the contact lug fastened to the first or second end face of the housing as a first contact lug, and
b. the cell comprises a second contact lug on the end face of the housing arranged opposite the end face to which the first contact lug is fastened.

In addition to the first contact lug, which has already been described in detail, the cell can additionally comprise a further contact lug fastened to the opposing end face. As mentioned above, contact lugs preferably can be led to the side of the opposing end face by bending through 90°. Correspondingly, the cell is preferably characterized by the additional feature a. specified immediately below:
a. the second contact lug extends over an angled contact lug region in the plane of the opposing end face.

By the angled contact lug region, contact-connection of both poles of the cylindrical cell can thus be executed in a particularly practicable manner from one side of the cell. This configuration of the cylindrical cell thus permits, for example, in a particularly preferred configuration, a simple fastening of the cell to a circuit board.

Figure 2:
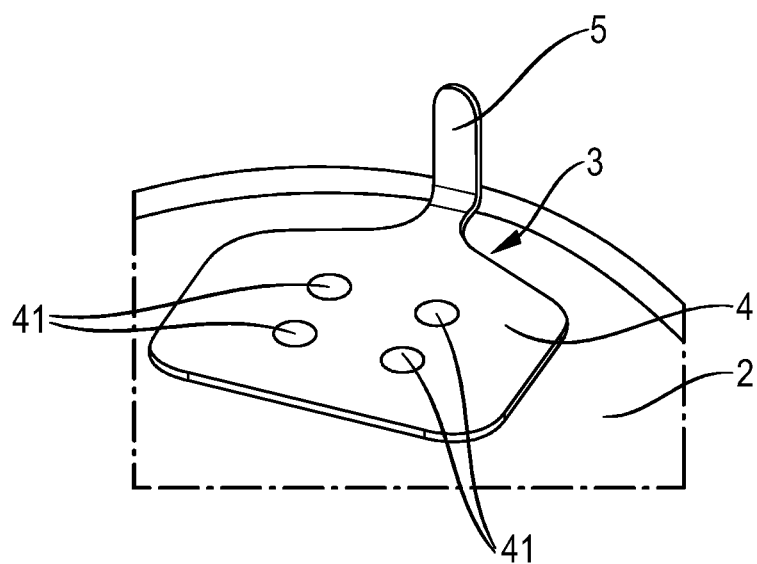
FIG. 2 shows an oblique view of a (partial) contact lug from the prior art which is fastened to one end face of a cylindrical cell.

The second contact lug can be configured, for example, in the manner of the contact lug identified by reference number 107 in FIG. 2 of the above-mentioned EP 3 667 761 A1.

In conventional cylindrical cells, the first contact lug, in particular, is a relatively small component which, in principle, is comprised solely of a planar contact-connection section, at which the contact lug is fastened to the end face of the cell, and a second contact-connection section in the form of a contact spike. The small size of this component can result in difficulties in the cell production process since the small component is difficult to handle during the fastening of the contact lug to the end face. Conversely, our contact lug having the damping section provides a particular advantage, in that pick-up options for the contact lug in the manufacturing process of the cylindrical cell, particularly in automated production, are significantly improved and simplified as a result such that our cell is also particularly advantageous with respect to the production and production costs thereof. Our cell is therefore particularly appropriate for automated production.

Particularly preferably, the contact lug or contact lugs of the cylindrical cell are characterized by at least one of the additional features a. and b. specified immediately below:
a. the contact lug or contact lugs are sheet metal parts, and
b. the contact lug or contact lugs are stamped parts.

Sheet metal parts, particularly in the form of stamped parts, can be produced very simply and cost-effectively and, moreover, do not significantly increase the weight of the resulting cylindrical cells.

Preferably, the contact lug or contact lugs are very thin sheet metal parts. Particularly preferably, the contact lug or contact lugs of the cylindrical cell can incorporate the additional feature specified immediately below, with respect to the thickness of the contact lug(s):
a. the contact lug or contact lugs assume(s) a thickness of 0.05 mm to 2.5 mm, and preferably 0.25 to 2.5 mm.

A thickness of the contact lug within the above-mentioned range ensures a sufficient stability of the contact lug(s). On the other hand, the thickness of the contact lug(s) ensures a sufficient oscillating capability of the first contact lug in the damping section of the contact lug such that, as a result, the impacts, oscillations or vibrations acting on the first contact lug can be buffered and damped in a particularly effective manner.

Metallic materials are particularly appropriate as a contact lug material. Particularly preferably, the cylindrical cell can incorporate the additional feature specified immediately below, with respect to the materials employed for the contact lug or contact lugs:
a. the contact lug or contact lugs are comprised of steel, particularly of special steel.

As a steel, for example, a "CRCA steel" (CRCA=cold rolled close annealed) can be employed.

Alternatively, the contact lug or contact lugs can also be comprised of nickel or nickel-plated metals, or of nickel alloys.

Particularly preferably, the cylindrical cell is a lithium-ion cell. Lithium-ion cells are characterized by a particularly high energy density, and can therefore be employed in various applications in a particularly advantageous manner. In connection with lithium-ion cells, the configuration of the first contact lug further provides an advantage, in that the safety aspect of lithium-ion cells is also taken into consideration in a particular manner. In particular, the first contact lug provides an option for the configuration of the damping section, particularly with a curved form such that a safety valve, particularly a rupture cross, is not obstructed.

Particularly preferably, the cell is characterized by at least one of the additional features specified immediately below:
a. the cell is a button cell,
b. the cell has a diameter of 5 mm to 25 mm, and
c. the cell has a height of 1.5 mm to 15 mm, preferably of 3 mm to 15 mm.

Preferably, the immediately above-mentioned features a. and b. or a. and c., and particularly preferably the immediately above-mentioned features a., b. and c., are realized in combination with one another.

The housing of the cell is preferably formed of two metallic housing parts that are preferably configured with a cup shape. Respectively, in addition to preferably circular bases, they preferably comprise a hollow cylindrical shell. The outer sides of the bases preferably constitute the above-mentioned end faces.

Between the two metallic housing parts, an annular plastic seal is preferably arranged, which electrically insulates the housing parts from one another. The seal moreover ensures a fluid-tight closure of the cells.

The housing parts can be comprised, for example, of nickel-plated steel or sheet metal. A trimetallic combination can also be considered by way of a metallic material, for example, with a sequence of nickel, steel (or special steel) and copper. It is also possible that one housing part is constituted of aluminium or an aluminium alloy, whereas the other is comprised of steel or a trimetallic material.

The electrodes of the cell are preferably configured in strip form, and are constituents of a composite winding body arranged in the interior space of the housing. This is preferably comprised of at least two strip electrodes (the positive and negative electrode) that are spirally wound about a winding axis, and at least one separator strip spirally wound about the winding axis. Preferably, the composite winding body is also configured as a cylinder, and likewise correspondingly, preferably comprises two circular end faces.

The end faces of the composite winding body are preferably constituted by the longitudinal edges of the at least one separator strip, and are oriented in the direction of the circular and mutually parallel housing bases such that the winding axis is oriented perpendicularly, or at least essentially perpendicularly to the housing bases. The winding axis and the cylinder axis preferably coincide. Exemplary composite winding bodies of this type are described inter alia in WO 2010/089152 A1.

Both the positive electrode and the negative electrode preferably comprise a strip-shaped metallic current collector, coated with an electrode material. The function of the current collectors is the electrical contact-connection of the electrode material over the largest possible surface area. They are customarily comprised of strip-shaped planar metal substrates, for example, metal foils, or a metal foam or a metal-coated fabric.

For the electrical contact-connection of the electrodes with the housing parts, these current collectors can be welded directly to the housing parts, preferably to the inner sides of the bases of the housing parts. Alternatively, the current collectors can also be welded to separate electrical conductors which, in turn, are electrically connected to the housing parts.

In particular, as electrode materials for the electrodes of the cell, all materials are considered which can take up and subsequently release lithium ions. For the negative electrode of secondary lithium-ion systems, carbon-based materials such as graphite, or non-graphite carbon-based materials that are capable of the intercalation of lithium are particularly suitable. For the positive electrode of secondary lithium-ion systems, for example, lithium metal oxide compounds and lithium metal phosphate compounds such as $LiCoO_2$ and $LiFePO_4$ are considered.

Electrodes can further contain electrode binders and conductive agents. Electrode binders ensure the mechanical stability of electrodes, and are responsible for the mutual contact-connection of particles of electrochemically active material, and for the contact-connection thereof with the current collector. Conductive agents such as carbon black increase the electrical conductivity of electrodes.

The electrodes are preferably impregnated with an appropriate electrolyte.

We further provide a method of producing the above-mentioned electrochemical cells. This production method primarily differs from conventional methods for the production of cylindrical cells by the employment of the above-mentioned first contact lug which, in addition to a first end-mounted contact-connection section and a second end-mounted contact-connection section, comprises the damping section interposed therebetween.

Preferably, according to the production method, first, in a manner which is known per se, the correspondingly prepared electrodes, for example, in the form of a composite winding body, are introduced into the interior of the housing of the cylindrical cell, the housing is closed and optionally sealed, and the electrodes are contact-connected with the end faces or poles of the cylindrical cell. On at least one of the end faces of the cylindrical cell, the contact lug having the damping section (first contact lug) is fastened, wherein the fastening of the contact lug to the end face of the housing is executed exclusively in the first contact-connection section. To this end, for example, a plurality of weld points can be provided that are formed by welding using a resistance welding or laser welding method. The damping section of the contact lug that succeeds the first contact-connection section is not directly connected to the end face, and is thus capable of free oscillation. At the end of the damping section, the second contact-connection section is located, which is provided for the contact-connection of the contact lug, and thus the respective pole of the cell, with an external electrical conductor, in a manner which is known per se.

Further features and advantages proceed from the following description of examples, in conjunction with the drawings. Individual features can be respectively realized in isolation, or in mutual combination.

FIG. 1 shows an oblique view of a button cell 1 from the prior art. The upper end face 2 constitutes the negative pole of the button cell 1, and the downward-facing end face (not visible) constitutes the positive pole of the button cell 1. At the end face 2, a contact lug 3 is fastened, which is subdivided into a planar first contact-connection section 4 and a second contact-connection section 5 in the form of a contact spike. The contact lug, at the first contact-connection section 4, is fastened to the end face 2 of the button cell 1. Connection to an external electrical conductor is executed via the second contact-connection section 5. In the context of FIG. 1, an external electrical conductor is understood as an electrical conductor by which the cell is directly or indirectly connected, for example, to a circuit board or similar. The button cell 1 moreover comprises a further contact lug 6. The further contact lug 6 is subdivided into a first contact-connection section 7, at which the contact lug 6 is fastened to the downward-facing end face, an angled contact lug section 8 and a further contact-connection section 9, at which contact-connection with an external electrical conductor can be executed in the region of the opposing end face 2. A button cell of this type is known, for example, in EP 3 667 761 A1.

FIG. 2 shows a contact lug 3 which is likewise known from the prior art and which, in principle, is structured in the manner of the contact lug 3 according to FIG. 1. The first contact-connection section 4 of the contact lug 3 is fastened to the end face 2 of the button cell by four individual weld points 41. The second contact-connection section 5, in that form of the contact lug 3, is located in an angled position to the plane of the end face 2 and, thus, simultaneously to the plane of the first contact-connection section 4 such that the second contact-connection section 5 is clearly accessible for contact-connection with an external electrical conductor.

Figure 3:
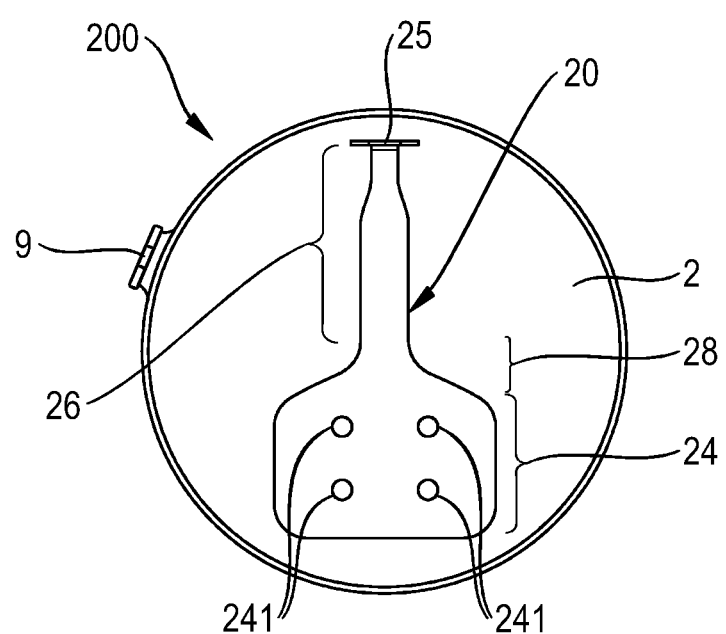
FIG. 3 shows a view of an example of one of our contact lugs fastened to one end face of a cylindrical cell.
Figure 4:
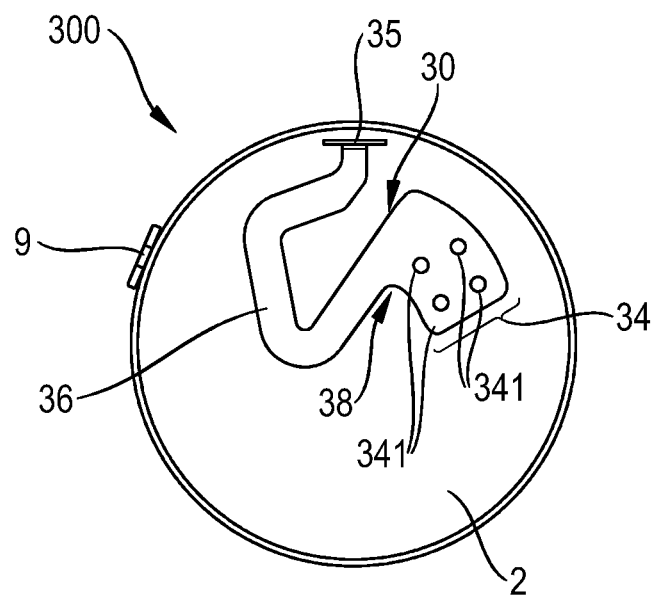
FIG. 4 shows a view of another example of one of our contact lugs fastened to one end face of a cylindrical cell.
Figure 5:
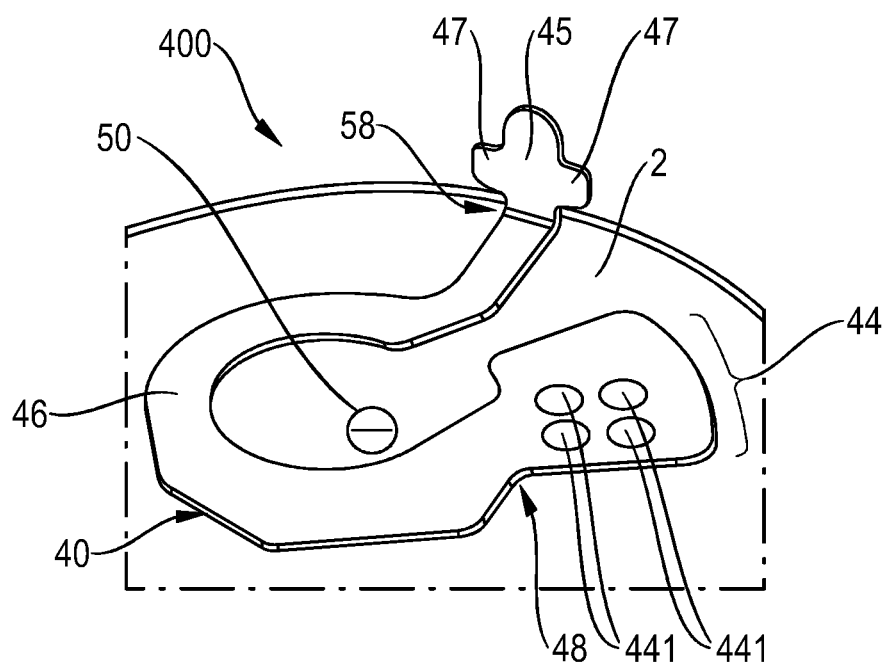
FIG. 5 shows an oblique view of a further example of one of our (partial) contact lugs, which is fastened to one end face of a cylindrical cell.

The configurations of our contact lugs represented in FIGS. 3 to 5, by the respective provision of a damping section within the contact lug, resolve the issue of the particular susceptibility of a contact lug 3 according to the prior art to impacts and vibrations.

FIG. 3 shows a particularly preferred example of a contact lug 20 located on the end face 2 of a button cell 200. The contact lug 20 comprises a first contact-connection section 24 with individual weld points 241 that fasten the contact lug 20 to the end face 2 of the button cell 200. A second, end-mounted contact-connection section 25 is further provided for the contact-connection of the cylindrical cell 200 with an external electrical conductor. Between the first contact-connection section 24 and the second contact-connection section 25, a damping section 26 is provided which, in this example, is strip-shaped and narrower in width than the first contact-connection section 24. The contact lug comprises a transition 28 from the first contact-connection section 24 to the damping section 26, in which the width of the contact lug decreases such that the cross-section of the contact lug reduces by at least 50%. The second contact-connection section 25 curves through 90°, and is thus axially and perpendicularly oriented to the first contact-connection section 24 and the damping section 26. Immediately ahead of the curved transition to the second contact-connection section 25, the damping section 26 tapers still further.

FIG. 4 shows a further particularly preferred example of a contact lug 30. Additionally to the first contact-connection section 34 with individual contact points or weld points 341 that are employed for the fastening of the contact lug 30 to the end face 2 of the button cell 300, the contact lug 30 in this example further comprises a second contact-connection section 35, which is curved through 90°, for the electrical contact-connection of the cell 300 with an external electrical conductor. Between the first contact-connection section 34 and the second contact-connection section 35, the damping section 36 is located that in this example assumes a curved, strip-shaped form. In this configuration, the curved form of the damping section 36 is achieved by two directional changes in the profile of the damping section 36. The contact lug comprises a transition 38 from the first contact-connection section 34 to the damping section 36, in which the width of the contact lug decreases such that the cross-section of the contact lug reduces by at least 50%.

FIG. 5 shows a further particularly preferred example of a contact lug 40 with a first contact-connection section 44 fastened to the end face 2 of the cylindrical cell 400 by four weld points 441 or comparable contact points. At the other end of the contact lug 40, the second contact-connection section 45 is located, via which a contact-connection with an external electrical conductor can be executed. In the representation shown in FIG. 5, the angling of the second contact-connection section 45 is visible. The second contact-connection section 45 is thus curved through an approximate right-angle from the plane in which the first contact-connection section 44 and the damping section 46 lie. The boundary between the second contact-connection section 45 and the damping section 46 runs along the bending line 58. The damping section 46 assumes a strip-shaped curved profile, which approximately describes a three-quarter circle. By this curvature of the damping section 46, a relatively long damping section 46 is constituted, with a simultaneously limited space requirement. Impacts, oscillations or vibrations can thus be optimally damped.

The curved, and particularly the arc of a circle form of the damping section 46 further permits the exposure or recessing, particularly of a central region on the end face 2 of the cylindrical cell 400, which can be employed for other purposes. In the configuration of the cylindrical cell 400 shown in FIG. 6, particularly in this central region of the end face 2, a safety valve 50 is provided in the form of a rupture membrane. As a result of the curved and arc of a circle form of the damping section 46, the safety valve 50 is not obstructed and, additionally, any rupture process is thus not impaired.

In this example, the second contact-connection section 45 comprises two lateral wings 47, by which contact-connection with an external electrical conductor, by a crimping process or a clamping method, can be supported, wherein the wings 47 are bent about the electrical conductor.

Overall, by the first contact lug of the cylindrical cell that is characterized by the damping section, compared to a conventional contact lug (c.f., e.g., FIG. 1 or 2), the service life of the fastening points of the first contact-connection section can be extended, wherein the impacts, oscillations or vibrations which compromise the fastening points are buffered. The same also applies, in principle, to connections on the second contact-connection section. The damping section thus diverts the impacts, vibrations and oscillations from the contact-connection sections of the contact lug.

In each of FIGS. 3 and 4, the further contact-connection section 9 of a second contact lug can moreover be seen that leads the contact from the opposing end face to the plane of the end face 2, about the outer shell surface of the cylindrical cell such that the cells 200 and 300 can be contact-connected, for example, on a circuit board in a particularly simple manner.

The invention claimed is:

1. An electrochemical cell comprising:
   a. a cylindrical housing that encloses an interior space having a first end face and a second end face that are interconnected by an annular shell, and
   b. a positive and a negative electrode are arranged in the interior of the housing,
   wherein
   c. the negative electrode is electrically connected, either directly or via a separate conductor, to the first end face to constitute a negative pole, and the positive electrode is electrically connected, either directly or via a separate conductor, to the second end face to constitute a positive pole, and
   d. a contact lug is fastened to the first or second end face of the housing,
   wherein
   e. the contact lug comprises a first end-mounted contact-connection section at which the contact lug is fastened to the end face,
   f. the contact lug comprises a second end-mounted contact-connection section for the contact-connection of the electrochemical cell with an external electrical conductor,
   g. the contact lug, between the first contact-connection section and the second contact-connection section, comprises a damping section capable of free oscillation, and
   h. the first contact-connection section and the damping section extend in a parallel plane to the plane of the end face to which the contact lug is fastened the cell is a button cell.

2. The cell according to claim 1, wherein
a. the damping section is not directly connected to the end face to which the contact lug is fastened.
3. The cell according to claim 1, wherein at least one of:
a. the damping section is configured with a strip shape,
b. the damping section comprises at least one strip-shaped section with an essentially constant width, and
c. the contact lug incorporates a transition from the first contact-connection section to the damping section in which the width of the contact lug decreases such that the cross-section of the contact lug is reduced by at least 30%.
4. The cell according to claim 1, wherein:
a. the damping section has a curved profile or a circular profile.
5. The cell according to claim 4, wherein at least one of:
a. the cell comprises a safety valve,
b. the cell comprises a safety valve in the form of a rupture cross, and
c. the damping section has a curved profile around the safety valve.
6. The cell according to claim 1, wherein:
a. the contact lug extends beyond the edge of the end face to which it is fastened.
7. The cell according to claim 1, wherein:
a. the cell comprises the contact lug fastened to the first or second end face of the housing, as a first contact lug, and
b. the cell comprises a second contact lug on the end face of the housing arranged opposite the end face to which the first contact lug is fastened.
8. The cell according to claim 7, wherein:
a. the second contact lug extends over an angled contact lug region in the plane of the opposing end face.
9. The cell according to claim 1, wherein:
a. the cell is configured for fastening to a circuit board.
10. The cell according to claim 1, wherein at least one of:
a. the contact lug or contact lugs are sheet metal parts, and
b. the contact lug or contact lugs are stamped parts.
11. The cell according to claim 1, wherein:
a. the contact lug or contact lugs have a thickness of 0.05 to 2.5 mm.
12. The cell according to claim 1, wherein:
a. the contact lug or contact lugs are comprised of steel, and
b. the contact lug or contact lugs are comprised of nickel or nickel-plated metals, or nickel alloys.
13. The cell according to claim 1, wherein:
a. the cell is a lithium-ion cell.
14. The cell according to claim 1, wherein at least one of:
a. the cell has a diameter of 5 mm to 25 mm, and
b. the cell has a height of 1.5 mm to 15 mm.
15. The cell according to claim 1, wherein the second contact-connection section extends at an angle to said plane.

* * * * *